United States Patent [19]

Fukuda

[11] Patent Number: 5,479,211
[45] Date of Patent: Dec. 26, 1995

[54] IMAGE-SIGNAL DECODING APPARATUS

[75] Inventor: Hiroyuki Fukuda, Tokyo, Japan

[73] Assignee: Olympus Optical Co., Ltd., Tokyo, Japan

[21] Appl. No.: 54,844

[22] Filed: Apr. 29, 1993

[30] Foreign Application Priority Data

Apr. 30, 1992 [JP] Japan .................. 4-110593
Sep. 4, 1992 [JP] Japan .................. 4-237014

[51] Int. Cl.$^6$ ............................ H04N 7/24; H04N 7/32
[52] U.S. Cl. .................. 348/405; 348/407; 348/699; 348/415; 348/416
[58] Field of Search .................. 358/133, 136, 358/167, 40; 348/405, 407, 412, 415, 416, 699, 420, 607; H04N 7/24, 7/32

[56] References Cited

U.S. PATENT DOCUMENTS

| | | | |
|---|---|---|---|
| 4,825,289 | 4/1989 | Ohta | 358/167 |
| 5,126,841 | 6/1992 | Tanaka et al. | 348/415 |
| 5,146,326 | 9/1992 | Hasegawa | 348/405 |
| 5,194,950 | 3/1993 | Murakami et al. | 358/136 |
| 5,241,387 | 8/1993 | Fujikawa et al. | 358/167 |
| 5,331,415 | 7/1994 | Hamasaki et al. | 348/607 |
| 5,337,088 | 8/1994 | Honjo | 348/420 |

Primary Examiner—Tommy P. Chin
Assistant Examiner—Vu Le
Attorney, Agent, or Firm—Frishauf, Holtz, Goodman, Langer & Chick

[57] ABSTRACT

An image-signal decoding apparatus decodes moving-picture data compressed by orthogonal transform, quantization, and variable-length coding for each block. A variable-length code decoding circuit decodes the compressed moving-picture data and outputs the decoded moving-picture data, a moving vector for each block, and block-type information. A distortion eliminator circuit eliminates block distortions from the moving-picture data decoded by the variable-length code decoding circuit. A judging circuit obtains a signal band for each block from the decoded moving-picture data and, based on the band and at least one of the moving vector for each block and the block-type information, changes the distortion elimination characteristics of the distortion eliminator circuit.

5 Claims, 7 Drawing Sheets

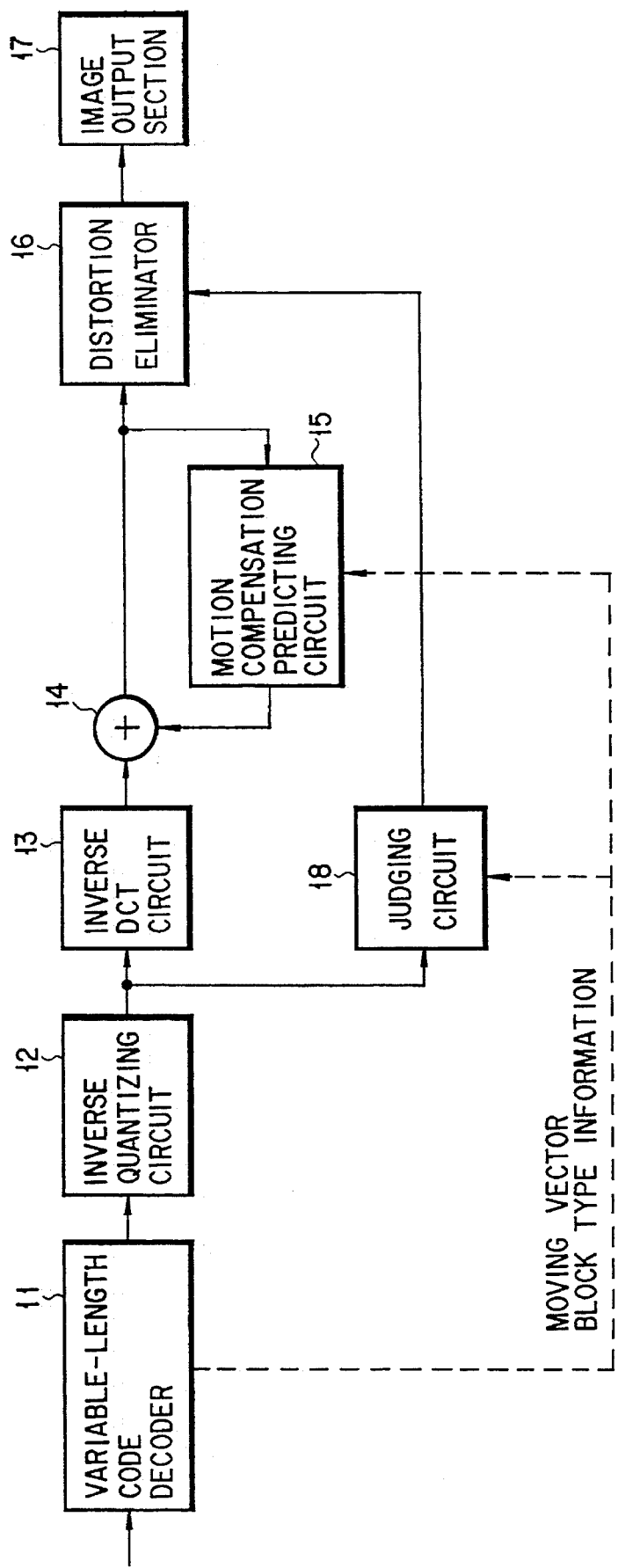
F I G. 1

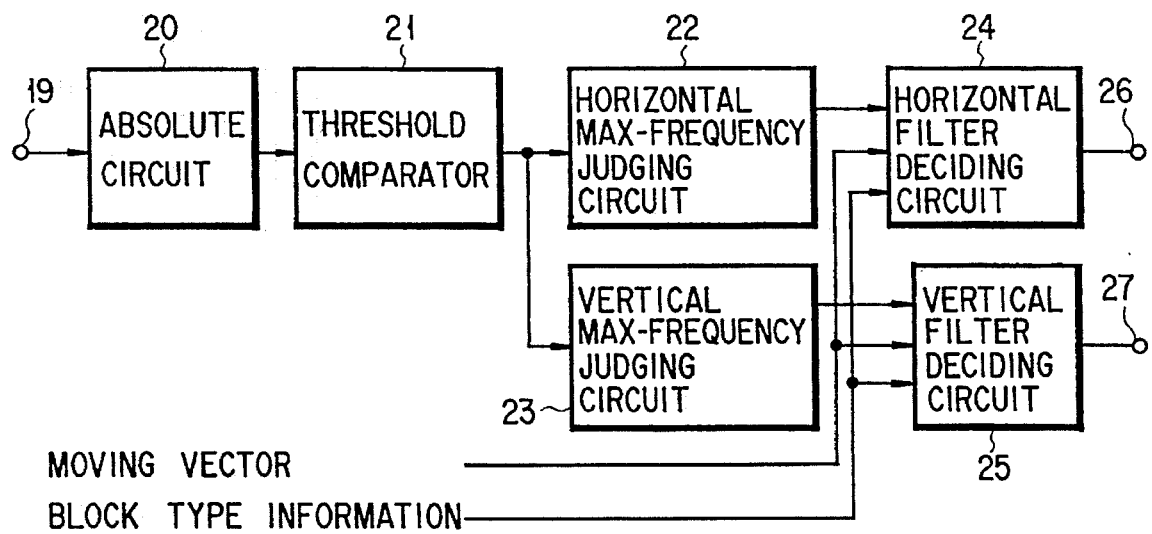
F I G. 2
F I G. 3

| $a_1$ | $a_2$ | $a_3$ | $a_4$ | $a_5$ |
|---|---|---|---|---|
| $a_6$ | $a_7$ | $a_8$ | $a_9$ | $a_{10}$ |
| $a_{11}$ | $a_{12}$ | X | $a_{13}$ | $a_{14}$ |
| $a_{15}$ | $a_{16}$ | $a_{17}$ | $a_{18}$ | $a_{19}$ |
| $a_{20}$ | $a_{21}$ | $a_{22}$ | $a_{23}$ | $a_{24}$ |
F I G. 4
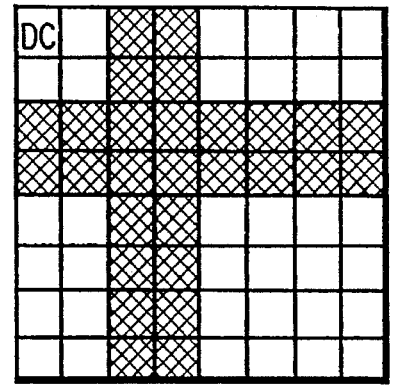
F I G. 5
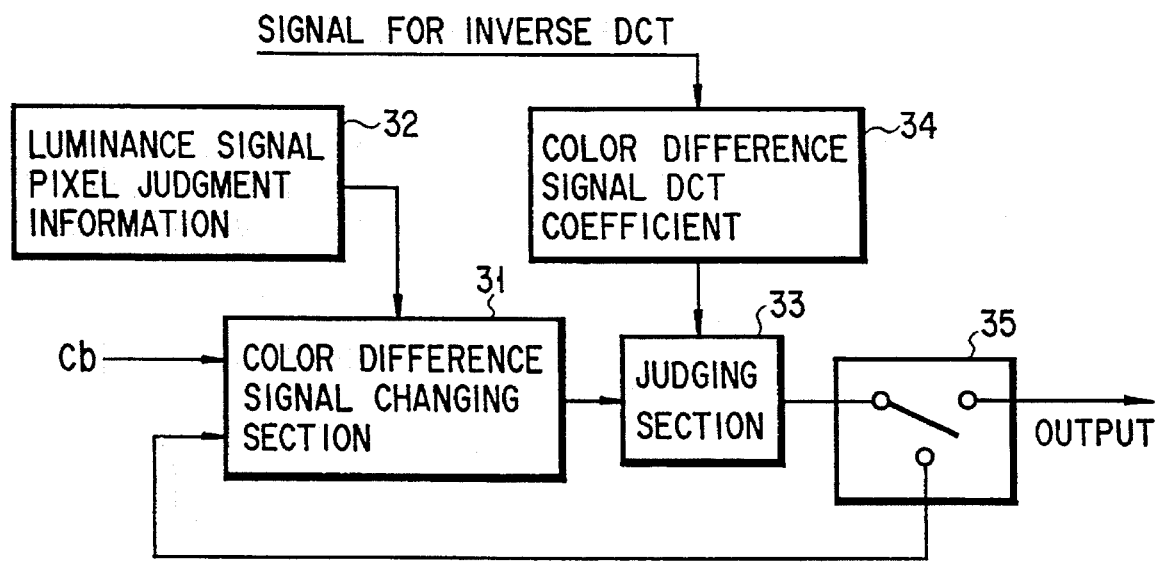
F I G. 6

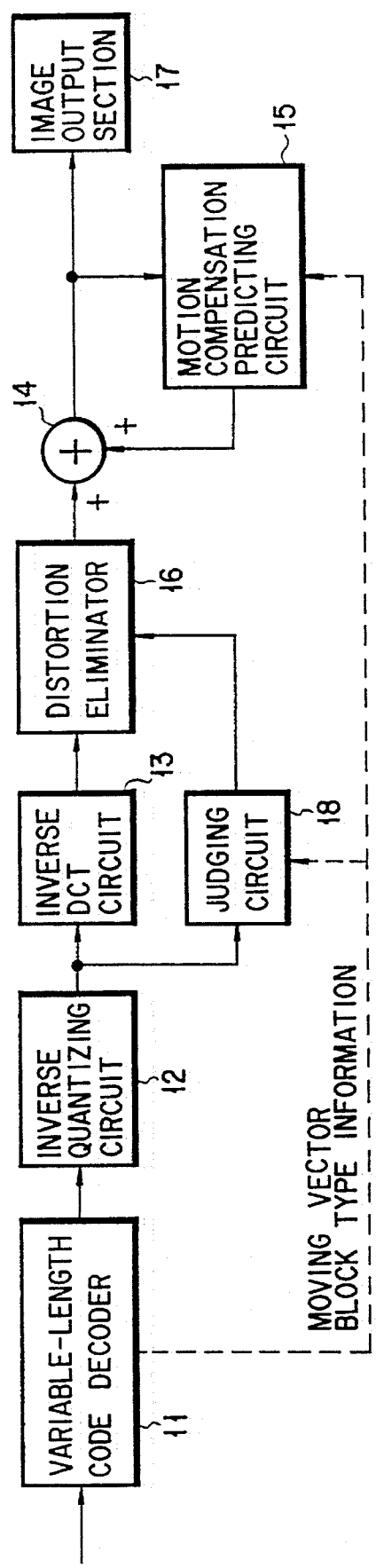
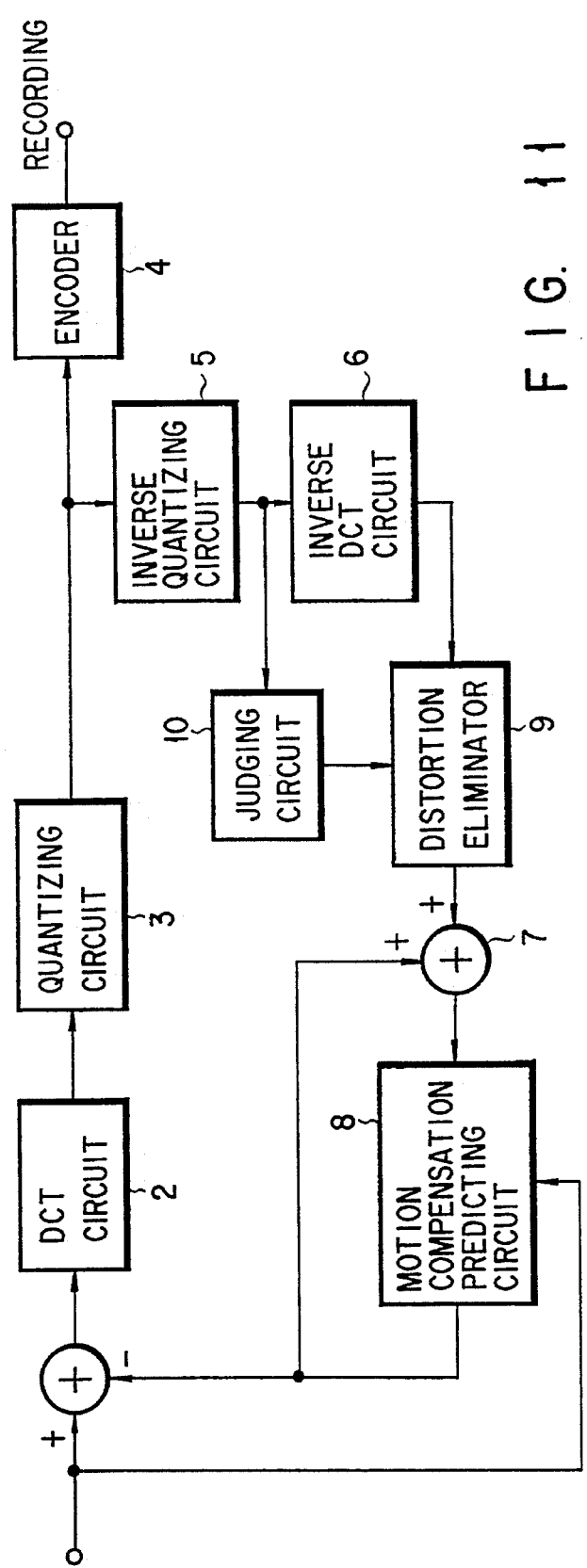
FIG. 10
FIG. 11

IMAGE-SIGNAL DECODING APPARATUS

BACKGROUND OF THE INVENTION

1. Field of the Invention

This invention relates to an image-signal decoding apparatus, and more particularly to an image-signal decoding apparatus that decodes an image transmitted or recorded after high-compression coding.

2. Description of the Related Art

When moving-picture signals from a solid-state imaging device such as a CCD, are recorded as digital data to a recording device such as a magnetic disk or a magnetic tape, the amount of data is very large. Thus, to record those signals in a limited memory capacity, it is necessary to compress the obtained image-signal data very effectively in a suitable manner.

A typical moving-picture compression system is a method in which high compression is achieved using interframe correlation, as proposed by ISO. This method will be explained briefly, referring to FIG. 12.

FIG. 12 is a block diagram of a conventional moving-picture compression system employing interframe correlation. In the figure, a predictive error signal from which a motion-compensated interframe predictive image is subtracted at a differential circuit 1, undergoes DCT (Discrete Cosine Transform) in blocks at a DCT circuit 2, and is then quantized at a quantizing circuit 3. Further, the quantization result is assigned codes of variable length at an encoder 4 and then recorded. The quantization result is also decoded by an inverse quantizing circuit 5 and an inverse DCT circuit 6, and then added with the motion-compensated interframe predictive image at an adder circuit 7. Next, a moving vector is obtained at a motion compensation predicting circuit 8 that contains an image memory having a variable delay function for compensating motion, and then a motion-compensated interframe predictive image for a subsequent frame is formed.

Such a series of processes is repeated until all frames are compressed. Their differential is not always encoded but the input image itself is sometimes encoded. The latter is called an I picture. There are the following two types of predictive error image.

One of them is called a P picture, which is the differential between an image to be encoded and an image previously encoded from the preceding I picture or P picture. In practice, the more efficient is used of a method of coding the difference from the motion-compensated predictive image and a method of coding without computing the differential or intra-coding.

The other is called a B picture, which is obtained by the most efficient among the coding and the intra-coding of three kinds of the difference between an image to be encoded and the preceding or the following image, or the interpolation image created from the preceding and following images. This prediction system allows switching in blocks with select information added to the code as a block type.

For the signal from which redundancy on the time axis is reduced by compensating for motion and computing the differential between images, DCT and a variable-length code are used to decrease redundancy with respect to space. A coding method using orthogonal transform such as DCT is widely used in compressing still pictures. This system will be explained hereinafter, referring to FIG. 13.

FIG. 13 is an explanatory diagram for the operation of compressing still pictures by a coding method using DCT. First, when a signal f from which redundancy on the time axis has already been decreased is supplied (101), the input image data f is divided into blocks $f_b$ of a specified size (102), and each block is subjected to two-dimensional DCT as orthogonal transform for conversion into F (103). Next, linear quantization is carried out according to each frequency component (104), and this quantized value FQ undergoes Huffman coding as variable-length coding (105). The result is then transmitted or recorded as compressed data C. At this time, the quantization width in the linear quantization is determined by preparing a quantizing matrix indicating a relative characteristic taking into account the visual characteristic for each frequency component and then multiplying the quantization matrix by a constant.

On the other hand, when image data is reproduced from compressed data, the quantized value FQ of a transform coefficient is obtained by decoding the variable-length code (C) (106). It is impossible, however, to obtain the true value F before quantization from this value, and the result from inverse quantization is consequently F' containing errors (107). Thus, this value (F') is subjected to IDCT (Inverse Discrete Cosine Transform) (108), and the resulting value ($f_b$) is inverse-blocked (109), which permits the obtained image data f' to contain errors as well.

Therefore, the reproduced image f' from the image reproduction apparatus (110) is poorer in picture quality. That is, errors in the value (F') of the result of the inverse quantization are ascribed to the cause of poorer picture quality of the reproduced image (f') as quantization errors.

More specifically, the input image data is first divided into blocks of a specified size (for example, blocks of 8×8 pixels). Each block is subjected to two-dimensional DCT as orthogonal transform and the resulting data is stored on an 8×8 matrix in sequence.

Image data, when seen in a two-dimensional plane, has a spatial frequency which is frequency information based on the distribution of shading information. Therefore, the DCT converts the image data into a direct-current (DC) component and alternating-current (AC) components. The data indicating the value of the DC component is stored in the position of the origin, or position (0,0), on the 8×8 matrix. Further, the data indicating the maximum frequency value of the AC components on the abscissa is stored in position (0,7); the data indicating the maximum frequency value of the AC components on the ordinate is stored in position (7,0); and the data indicating the maximum frequency of the AC components in a diagonal direction is stored in position (7,7). In each intermediate position, the frequency data in the direction related to each coordinate position is stored in such a manner that the higher-frequency data appears in sequence, starting on the origin side.

Next, by dividing the stored data in each coordinate position on the matrix by the quantization width for each frequency component, linear quantization is carried out according to each frequency component. The quantized value is subjected to Huffman coding for variable-length coding. At this time, for the DC component, the differential value between the DC component and those of adjacent blocks is subjected to Huffman coding. For the AC components, scanning from low to high frequencies called zigzag scanning is done to perform Huffman coding of the number of consecutive invalid components (whose value is zero), or the number of consecutive 0s, and the values of components that follow. The result is used as data.

In this method, the compression rate is generally controlled by changing the quantization width. The higher the compression rate, the greater the quantization width. This makes a quantization error greater, resulting in noticeable degradation of quality of the reproduced image.

This quantization error in a transform coefficient tends to appear as so-called block distortion where discontinuities occur in the boundary between blocks in the reproduced image, or mosquito noise where a fog takes place in a flat portion near the edge. Since those distortions are visually noticeable, this gives a bad impression even if signal-to-noise ratio is good.

To overcome this drawback, a method has been worked out which permits the image reproduced by an encoder to pass through a low-pass filter for eliminating distortions. The filter, however, has the disadvantage of blurring the edges when they are in the image, although being able to eliminate distortion relatively well, of being unable to eliminate block distortions completely if the low-pass band is loosened in order to decrease the blurring.

To cope with those disadvantages, in a known method, the presence and absence of edges and distortions in the image are sensed, and based on the result, whether a filter is used or not is determined, and then only distorted portions are allowed to pass through the filter.

A conventional method of eliminating distortions as described above, however, still has the disadvantage of blurring the image. In addition, the conventional method requires the calculation of the amount of block distortion and consequently a longer processing time, with the result that the size of circuitry and power consumption are extremely large. Therefore, it is difficult to apply the above-mentioned system to a product that needs compactness and high-speed operation, particularly a product handling moving pictures.

SUMMARY OF THE INVENTION

Accordingly, the object of the present invention is to provide an image-signal decoding apparatus that allows a simple circuit to eliminate distortions at a high speed without creating blurs or the like in the image.

The foregoing object is accomplished by providing an image-signal decoding apparatus for decoding moving-picture data compressed by orthogonal transform, quantization, and variable-length coding for each block, comprising: variable-length code decoding means for decoding the compressed moving-picture data and outputting the decoded moving-picture data, a moving vector for each block, and information on block type; distortion-eliminating means for eliminating block distortions from the moving-picture data decoded by the variable-length code decoding means; and judging means for obtaining a signal band for each block from the decoded moving-picture data and, based on this band and at least one of the moving vector for each block and the information on block type, changing the distortion elimination characteristic of the distortion-eliminating means. .

BRIEF DESCRIPTION OF THE DRAWINGS

The accompanying drawings, which are incorporated in and constituted a part of the specification, illustrate presently preferred embodiments of the invention, and together with the general description given above and the detailed description of the preferred embodiments given below, serve to explain the principles of the invention.

FIG. 1 is a block diagram showing the construction of an image-signal decoding apparatus according to a first embodiment of the present invention;

FIG. 2 is a block diagram of an example of the judging circuit of FIG. 1;

FIG. 3 shows the data on a block supplied from the threshold comparator circuit of FIG. 1;

FIG. 4 shows a mosquito noise-eliminating filter;

FIG. 5 shows DCT coefficients used to determine the filter characteristic;

FIG. 6 is a block diagram of another example of eliminating mosquito noise in the color difference signal;

FIG. 10 is a block diagram showing the construction of an image-signal decoding apparatus according to a second embodiment of the present invention;

FIG. 11 is a block diagram of an example of applying the encoding system of FIG. 10 to the local decoder in the conventional moving-picture compression system shown in FIG. 12;

DETAILED DESCRIPTION OF THE PREFERRED EMBODIMENTS

Figure 7A:
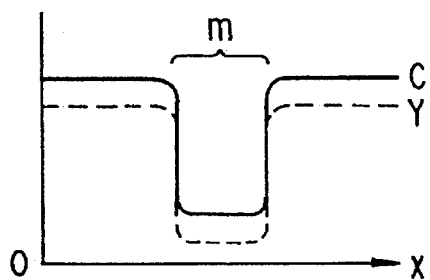
FIGS. 7A through 7G are explanatory diagrams for the processes of eliminating mosquito noise.

First, a general idea of this embodiment will be explained.

Conspicuousness of image distortion generally changes with the spatial frequency that adjacent images have. For example, when block distortion has occurred in a portion of a fine structure where components range up to a high spatial frequency, the block distortion is not conspicuous so much. In contrast, when block distortion takes place in a portion where there are only low spatial frequency components changing relatively gently, the block distortion tends to be conspicuous.

Since block distortion is ascribed to discontinuities in the boundary between blocks, it contains components ranging up to a very high spatial frequency. Therefore, by eliminating higher spatial frequencies than those that images near the distortion have, the block distortion can be made inconspicuous.

In a portion where a motion takes place, the greater the motion, the less conspicuous the blurring of the image. Consequently, depending on the activeness of a motion, the frequency band which may be removed from a picture quality viewpoint, changes. Thus, even if a block has a fine structure, heavy low-pass filtering is applied to an actively moving portion.

Mosquito noise is characterized by being most noticeable when a motion is relatively slow. Therefore, when it is judged that mosquito noise is conspicuous from the amount of motion, the distortion elimination characteristic is adjusted for elimination of mosquito noise.

For an actively moving block, a moving vector sometimes cannot be sensed and consequently, motion compensation cannot be made, with the result that intracoding may be selected. Thus, although a moving vector is used as a means to know the amount of motion, the type of each block may be used as information to determine the distortion elimination characteristic.

In this embodiment, the distortion elimination characteristic is changed adaptively as mentioned above, by using the transform coefficient, the moving vector for each block, the block type information, and others.

If the orthogonal transform coefficient of a block being noticed is a DCT coefficient of 8 pixels×8 pixels, when the absolute value of each coefficient is compared with the threshold value, it is judged that the coefficients corresponding to lower frequencies than a specific frequency in an ordinary block are significant coefficients. In this case, it is understood that the block contains such a construction as can be expressed by the information ranging up to the frequencies corresponding to significant coefficients in the horizontal and vertical directions. Thus, the filter characteristic for this block should be such that higher frequencies than the significant coefficients are cut off.

When filtering is done in a spatial frequency plane, it is impossible to carry out the process while changing the characteristic of the filter, so that an image must be composed after the image is subjected to blocking, filtering in a spatial frequency plane, and inverse transform. At that time, the effect of blocking must be taken into account. Thus, the filtering is realized by convoluting in the real space and the coefficients convoluted are changed for each block.

Since the kernel size of the filtering is finite, it is impossible to obtain an ideal sharp cut-off characteristic. The characteristic, however, is acceptable for practical use. The filter coefficient and kernel size, which may be determined in an arbitrary manner, are determined taking into account the computing time and the cut-off characteristic.

Therefore, by adaptively applying to each block such a convolution low-pass filter as maintains the band that the significant data has of the transform coefficients obtained by decoding the compressed data, distortions can be eliminated without blurring the construction of each block. Because the characteristic of the filter is determined by using the transform coefficients, interim results of the decoding process, it is not necessary to sense the presence and absence of edges and block distortions in the image, which makes the circuit arrangement very simple. Further, because what to do in the process is comparison with the old value, the time required for the processing can be shortened.

FIG. 1 is a block diagram showing the construction of an image-data decoding apparatus to which an image-signal decoding apparatus of this embodiment is applied. In the figure, numeral 11 indicates a variable-length code decoding circuit, which decodes the code data for each block of an image. The decoded data is supplied to an adder circuit 14 via an inverse quantizing circuit 12 and an inverse DCT circuit 13. The output of the adder circuit 14 is adored to itself via a motion compensation predicting circuit 15, and at the same time, is supplied to an image output section 17 via a distortion eliminator circuit 16. A judging circuit 18, receiving the output of the inverse quantizing circuit 12, determines an optimum distortion-eliminating process to control the distortion eliminator circuit 16.

With the decoding apparatus thus constructed, the code data for each block of an image is decoded by the variable-length code decoding circuit 11, and is returned to an interframe differential signal by the inverse quantizing circuit 12 and the inverse DCT circuit 13. Then, the interframe differential signal is added to the predictive signal from the motion compensation predicting circuit 15 at the adder circuit 14. The result is supplied to the motion compensation predicting circuit 15 to obtain a predictive signal for the next frame. It is also supplied to the image output section 17 after being subjected to the optimum distortion-eliminating process at the distortion eliminator circuit 16.

The motion compensation predicting circuit 15 produces a motion compensation predictive signal for the next frame on the basis of the reproduced image signal, and the moving vector and block type information sent together with the image code data. The judging circuit 18 obtains a frequency band for each block in the vertical and horizontal directions from the output of the inverse quantizing circuit 12, and based on the result and the moving vector and block type, determines an optimum distortion-eliminating process to control the distortion eliminator circuit 16.

In this way, filtering of the band of the information recorded in blocks can be done with almost no loss. That is, such low-pass filtering as manages not to blur the construction in the block can be realized by applying such low-pass filtering as averages a wide range to blocks only containing low spatial frequency components, and in contrast, by applying such light low-pass filtering as does not blur very much to blocks containing up to relatively high frequency components.

Namely, the optimum one is selected for each pixel being noticed from convolution filters of different, cut-off frequency characteristics. In the characteristics of the filter, the coefficient and size of the filter are changed. In the case of heavy low-pass filtering, the coefficient is such as to be the average of the values of pixels in a relatively wide area around the pixel being noticed, with a large filter size. On the other hand, in the case of light low-pass filtering, the coefficient is such as to be the average of the values of pixels in a relatively narrow area around the pixel being noticed, with a small filter size.

Since such filtering can be applied to a block for which heavier low-pass filtering or mosquito noise-eliminating filtering has been judged to be suitable depending on the motion, conspicuous distortions can be effectively eliminated according to the amount of motion. In addition, degradation including blurring in the image can be prevented.

FIG. 2 is a block diagram of the judging circuit 18 of FIG. 1. In the figure, the output of the inverse quantizing circuit 12 is first supplied from the input terminal 19 to an absolute value circuit 20, which calculates an absolute value. The computation result is compared with a predetermined threshold value at a threshold comparator circuit 21 to separate the significant coefficients from the insignificant ones. The result is supplied to a horizontal max. frequency judging circuit 22 and a vertical max. frequency judging circuit 23, which obtain the maximum frequency in the respective directions. The maximum frequencies are supplied to a horizontal filter deciding circuit 24 and a vertical filter deciding circuit 25, respectively, which determine the kernel size and coefficient of the filter in each direction. At this time, the moving vector and block type information are also taken into account. These information is supplied from the output terminals 26 and 27 to the distortion elimination circuit 16.

The judgment of the maximum frequency and the decision of a filter will be explained, using an example of the horizontal direction.

The data on a block is scanned zigzag in the sequence shown in FIG. 3 by the threshold comparator circuit 21. Therefore, the horizontal max. frequency judging circuit 22, depending on in what number of the order of coefficients the significant coefficient arrived is, determines which column it belongs to, and obtains the maximum frequency in the horizontal direction on the basis of the maximum of the column numbers of all significant coefficients.

For example, when the first coefficient is a significant coefficient, a 1 is supplied to a temporary memory. Then, when the 14th coefficient is a significant coefficient, it can be seen from FIG. 3 that it is a coefficient at the intersection of the second row and the fourth column. Thus, the value in the temporary memory is compared with column number 4, and the larger value is stored in the temporary memory. In this way, after judgment has been made on all the significant coefficients in the block, the value in the temporary memory is supplied. Therefore, for example, even if the 20th coefficient is a significant coefficient after the 14th coefficient, the output of the horizontal max. frequency judging circuit 22 remains unchanged because it is one of the second-column coefficients.

In this way, after the maximum frequency has been obtained, the horizontal filter deciding circuit 24 selects a filters corresponding to the maximum frequency when it is judged on the basis of the moving vector and block type that a motion is great, the selected filter is changed to a heavier low-pass filter when it is judged that a motion is slow, a command is given to the distortion eliminator circuit 16 so that mosquito noise filtering may be done after low-pass filtering.

Preparing only nine types of low-pass filters is sufficient for the horizontal filter deciding circuit 24, because the output takes the values ranging from 0 to 8. Normally, four to five types of filters or less are enough. Similarly, a filter is determined in the same manner in the vertical direction. The correspondence between the sequence of coefficients and the row and column numbers, and the filter characteristics are previously stored in a table.

FIG. 4 shows a sigma filter for eliminating mosquito noise. In the figure, if x indicates a pixel now being noticed to be processed, $a_1$ through $a_{24}$ denote pixels around the pixel being noticed, then the value x' of the new x will be expressed as:

$$x' = x - \sum_{k=1}^{24} b_k F(x - a_k) \quad (1)$$

where $b_k$ is a weight that changes with the distance to the pixel being noticed.

$$F(y) = \begin{cases} y, & |y| \leq \theta \\ \phi, & |y| > \theta \end{cases} \quad (2)$$

where $\theta$ is a threshold value, which is a parameter in changing the noise elimination characteristic. Generally, the greater the value of the $\theta$, the more effective the mosquito noise elimination. Consequently, dusty signals in the image are removed more effectively. In contrast, when the $\theta$ is made smaller, the effect of the filter also becomes smaller. At $\theta=0$, the effect is the same as no filter is used.

While in this embodiment, the values of $b_1$ through $b_{24}$ are set at 1/24, a suitable value may be selected for the distortion elimination characteristics. It is desirable on an experimental basis that a value that meets $\Sigma b_K=1$ should be set. It is also desirable that $\theta$ should be set at approximately 1/10 the maximum value of the pixel value. For example, in the case of an image of 8-bit data, setting $\theta$ at approximately 20 to 30 enables distortions to be eliminated effectively.

Next explained will be an example of adaptively applying the sigma filter.

As mentioned above, the characteristics of a filter can be changed by changing the value of $\theta$. That is, mosquito noise can be decreased by judging conspicuousness of mosquito noise from the motion information as noted above, and based on the result, changing the characteristics of the filter. A method explained below is to obtain conspicuousness of mosquito noise for each block in the image and, based on the result, change the value of $\theta$.

In FIG. 1, a DCT coefficient for each block is supplied to the judging circuit 18 to compute the sum of the absolute values of the individual AC coefficients.

From the power in the spatial frequency plane of the result, the complexity of a pattern in the block can be estimated. Therefore, a block whose complexity is high is subjected to filtering with a larger $\theta$.

Further, in this method, by using only coefficients having a strong,effect on the complexity of a pattern, not using the coefficients of all the AC components, in obtaining the sum of the absolute values of DCT coefficients, it is possible not only to shorten the calculation time but also to judge conspicuousness of mosquito noise accurately.

FIG. 5 shows the arrangement of the DCT coefficients of a 8×8 block, where the DC component is at the top left corner.

In this embodiment, the sum of the absolute values of the DCT coefficients in the hatched portions in the figure is obtained. When the value is large, $\theta$ is made larger; when it is small, $\theta$ is made small.

By doing this, it is possible to apply a mosquito noise eliminating filter adaptively to still pictures as well as moving pictures.

FIG. 6 is a block diagram of another example of eliminating mosquito noise in a color difference signal.

In a color difference signal changing section 31, the input signal is a color difference signal $C_b$ obtained by decoding the compressed signal, which is used as an original signal O(x). This signal is subjected to DCT for quantization. F(u) indicating the DCT coefficient of a frequency u is subjected to IDCT and is expressed as a signal f(x).

Then, based on the luminance signal pixel judging information 32, changed signal f'(x) is obtained from the signal f(x) as explained later. In a judging section 33, this signal undergoes DCT at a DCT circuit (not shown) to obtain a DCT coefficient F'(u).

Next, a color-difference signal DCT coefficient 34 or the DCT coefficient F(u) is compared with the DCT coefficient F'(U) at the judging section 33. If equation (3) explained later holds true, F'(x) is supplied via a switch 35, If not, the signal returns to the color-difference signal changing section 31, and the DCT signal coefficient F'(u) is obtained again.

FIGS. 7A through 7G are explanatory diagrams for the process of eliminating mosquito noise in the color-difference signal in the embodiment, each being simplified one-dimensionally. The luminance signal Y and color-difference signal C of the original signal shown in FIG. 7A are for a composition where branches of a black tree expend in a blue sky, for example. The luminance signal Y changes abruptly at the branch portion m, where the color-difference signal. C also changes from blue to black.

Figure 7B:
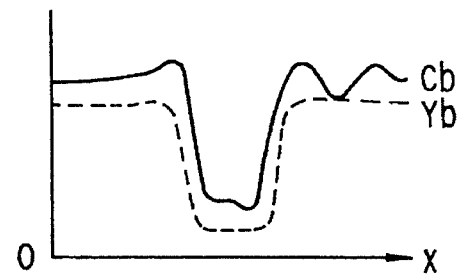

When these signals are reproduced after compression, they change as shown in FIG. 7B. In this case, because the degree of compression is large for the color-difference signal $C_b$ compared with the luminance signal $Y_b$, the amount of distortions becomes large.

The image signal shown in FIG. 7B is an example of a block of image signals obtained by decoding the compressed signal.

If the original signal of the input image is $O(x)$, signal $f(x)$ will be obtained as the color difference signal $C_b$ by allowing DCT coefficient $F(u)$ of the original signal $O(x)$ to undergo IDCT. Here, the DCT coefficient $F(u)$ indicates the DCT coefficient of frequency u obtained by allowing the original signal $O(x)$ to undergo DCT and quantization.

By decoding the signal $f(x)$ into the original signal $O(x)$, mosquito noise can be eliminated.

For information for decoding obtainable on the decoder side, there are only signal $f(x)$ or DCT coefficient $F(u)$ to express it and the luminance signal $Y_b$. Here, the signal (broken line) corresponding to the luminance signal $Y_b$ is indicated by $g(x)$.

Figure 8:
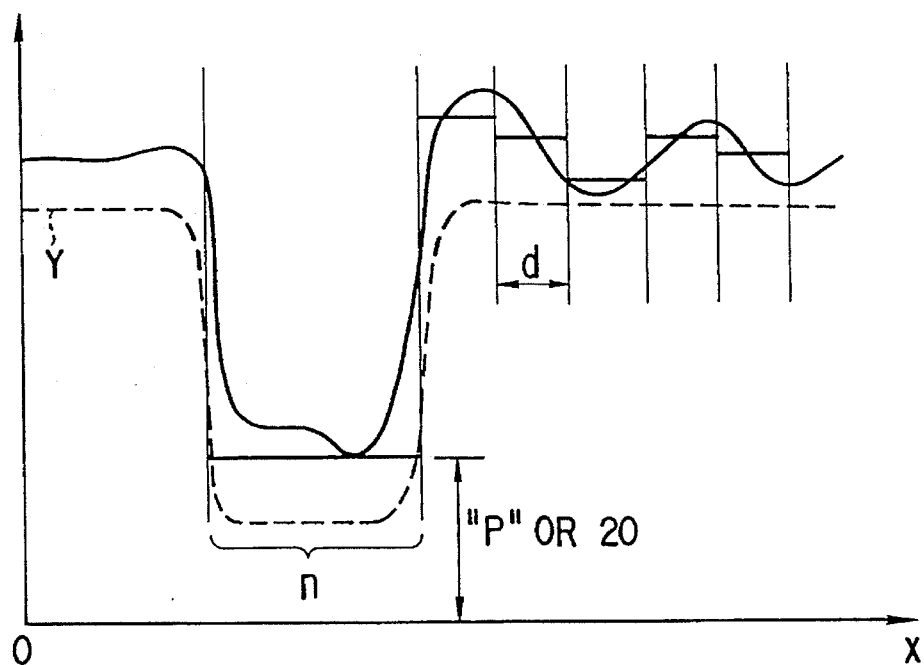
FIG. 8 shows an example of approximating a rectangle of a specified size to color difference signal $C_b$.
Figure 9A:
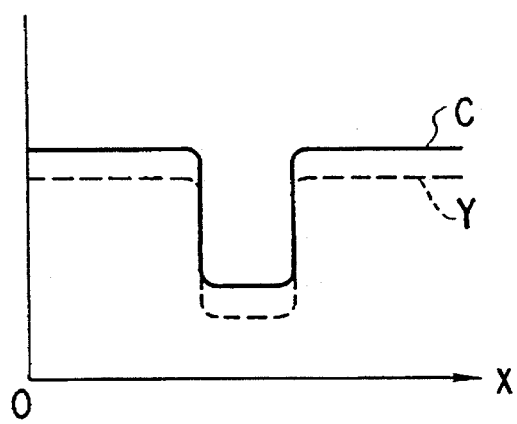
FIG. 9A shows an original signal one-dimensionally indicating the luminance signal and the color difference signal of an image of branches of a black tree expanding against the blue sky.
Figure 9B:
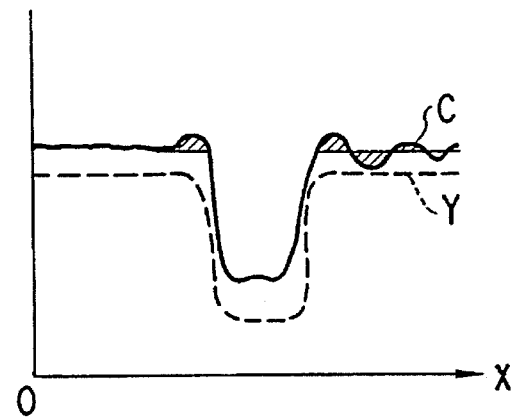
FIG. 9B shows its conventional decoded signal.

Signal $f'(x)$ is obtained by approximating a rectangular of a specfied block size d to the value of $f(x)$ so that a signal that can be regarded as noise in signal. $f(x)$ may become small as shown in FIG. 8. $F'(u)$ obtained by DCT of the changed $f'(x)$ is compared with $F(u)$ using the following expression:

$$|F'_{(u)} - F_{(u)}| \leq E_{(u)} \qquad (3)$$

When expression (3) holds, $f'(x)$ is regarded as an approximation of $f(x)$, and is used as the color-difference signal $C_c$ in place of $f(x)$.

When expression (3) does not holds, the color-difference signal is changed again. That is, signal $f'(x)$ is obtained again by narrowing the width of averaging block size d shown in FIG. 8.

It is assumed that $E(u)$ in expression (3) at this time is the center of the quantization error width, half the value of the quantization width of the DCT coefficient. That is, it indicates the maximum value that the quantization error for each frequency u can take.

Next explained will be how to obtain the changed signal $f'(x)$.

It is first judged from the present luminance signal $Y_b$ whether the luminance of the pixel is very high or very low, and from the result, it is possible to determine whether it is a saturated pixel or not (that is, a bright point portion or a too dark portion).

Namely, it is understood that the portion m judged to be a saturated pixel from the luminance signal $Y_b$ has a value close to the color difference "0" of black or white (portion n in FIG. 8), regardless of the value of the color-difference signal $C_b$.

Figure 7C:
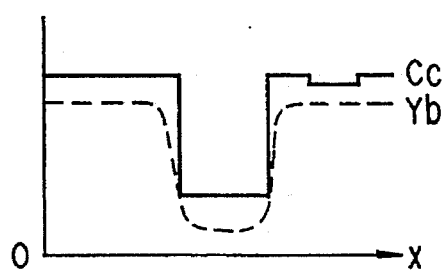
Figure 7D:
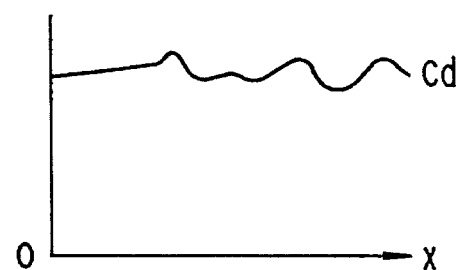
Figure 7E:
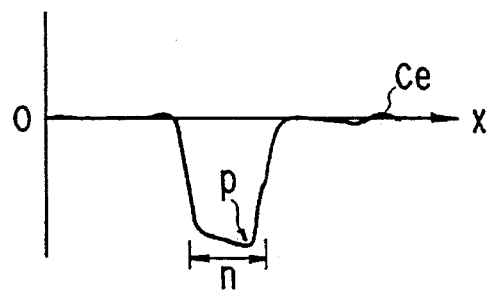
Figure 7F:
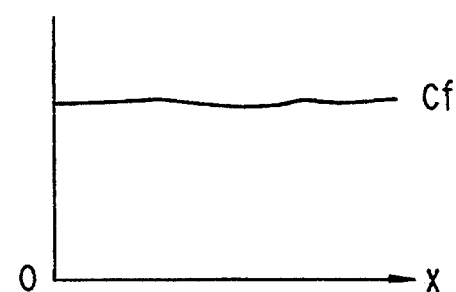

Thus, by replacing the luminance at portion n or the color-difference signal for the portion of saturated pixels or the too dark portion, as shown in FIG. 7E, with a value close to "0" (a bottom value p or 20 for 0 through 255 in FIG. 8) and by averaging the remaining portion (Cd shown in FIG. 7D) with the values of the nonsaturated color-difference signals nearby, the average value shown in FIG. 7F is obtained.

Specifically, it is expressed as:

$f_{(x)}=0$ (for a saturated pixel) the average value of the nonsaturated pixels in the block.

There is another method of obtaining a step-like signal $C_c$ as shown in FIG. 7C by quantizing the values of nonsaturated pixels using the following equation:

$f_x = int\ \{f_x/A\} \times A$ where A is a given value and int is a function of rounding off to an integer.

Next explained will be another embodiment in relation to the change of the color-difference signal in its saturated pixel portion n.

Figure 7G:
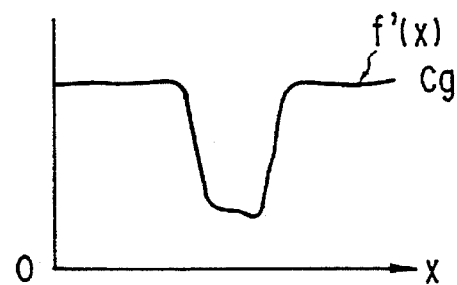

Subtracting color-difference signal $C_d$ from color-difference signal $C_b$ allows only the waveform of signal $C_e$ of the branch portion to be extracted. By adding this to the signal (Cf) obtained by applying low-pass filtering to $C_d$, the color-difference signal $C_g$ shown in FIG. 7G is obtained. This color-difference signal $C_g$ is used as $f'(x)$.

This signal $f'(x)$ is supplied as a corrected color-difference signal to the judging section 33.

After the judgment at the judging section 33, if expression (3) holds, an image is reproduced using $f'(x)$.

If it does not holds, the width of the averaging block size d is made narrower, more specifically, the degree of the low-pass filter is loosened in obtaining $C_f$, that is, the pass band is broadened, and the color-difference signal $C_f$ is recalculated. The color-difference signal $C_e$ is added to the resulting signal to obtain a color-difference signal $C_g$.

This is repeated by switching the switch 35 and supplying the input to the color-difference changing section 31 until expression (3) holds true.

As explained above, by using the construction of FIG. 6, it is possible to eliminate distortions that change slowly in the block, such as mosquito noise in the color-difference signal perceptible as blurred colors or colored pattern noise appearing in the reproduced image in decoding the image data. This process may be applied only to a block for which it is judged from the $Y_b$ signal that a saturated pixel exists. Low pass of a block containing saturated pixels may be enhanced by allowing the color-difference signal to undergo low-pass filtering over the whole image.

A second embodiment of the image-signal decoding apparatus using the distortion-eliminating process will be explained, referring to FIG. 10.

In the figure, numeral 11 indicates a variable-length code decoding circuit, which decodes code data for each block of an image. The decoded signal is returned to an interframe differential signal via an inverse quantizing circuit 12 and an inverse DCT circuit 13. A distortion eliminator circuit 16 removes distortions from the signal and supplies the resulting signal to an adder circuit 14. The output of the adder circuit 14 is added to itself via a motion compensation predicting circuit 15, and at the same time, is supplied as a reproduced image to an image output section 17.

This embodiment is characterized in that the distortion-eliminating process is applied before motion compensation to the signal obtained by decoding the interframe correlation signal, or the signal recorded as DCT coefficients.

For example, even if the (n+1)th frame signal obtained by computing the differential from the nth frame, is compressed and recorded, the resulting signal is still an interframe differential signal, which will not return to the original image, even if being decoded. The decoded signal from the interframe differential signal, however, has distortions due to compression. Adding the decoded signal to the reproduced signal of the nth frame permits the distortion to accumulate. To avoid this problem, distortions are eliminated at the level of the interframe differential signal. After this, the resulting signal is added to the preceding frame. With this arrangement, the DCT coefficient for the interframe differential signal is used for determining the distortion elimination characteristic, so that distortions can be removed most effectively. This embodiment is almost the same in the arrangement as the first embodiment of FIG. 1 except that the distortion-eliminating process is performed of the interframe differential signal and then resulting signal is added to the preceding signal, instead of carrying out the distortion-eliminating process of the reproduced image added to the preceding motion-compensated frame signal. Because the images after the distortion-eliminating process are added for each frame, when frames using interframe differentials continue, the difference between the motion compensation predictive image during encoding and the motion compensation predictive image during decoding becomes large, with the result that errors are rather conspicuous. To overcome this problem, an encoding apparatus suitable for a decoding apparatus as shown in FIG. 10 will be explained, referring to FIG. 11.

Figure 12:
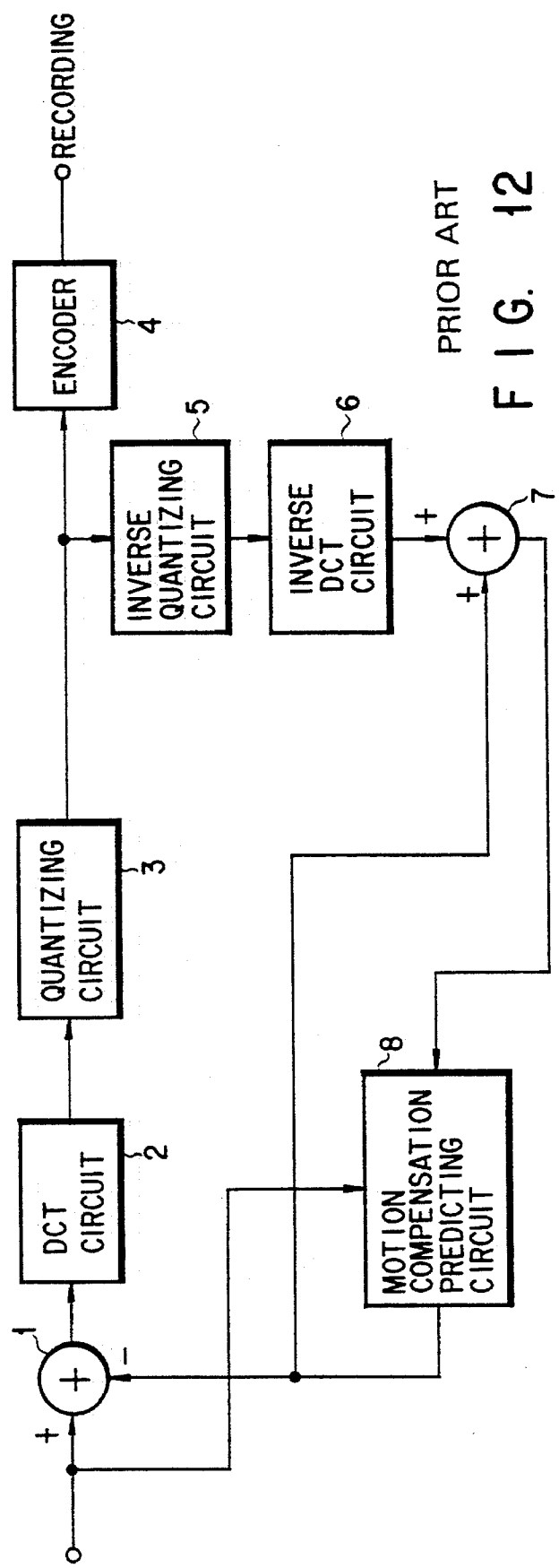
FIG. 12 is a block diagram of a conventional moving-picture compression system using interframe correlation.
Figure 13:
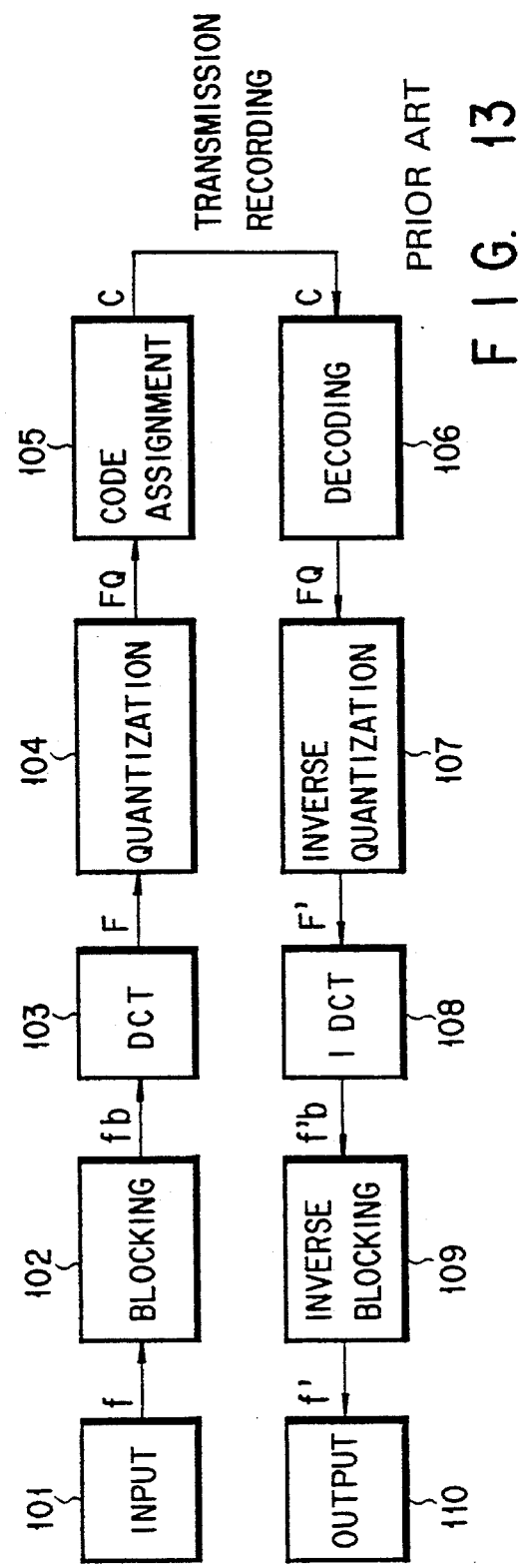
FIG. 13 is an explanatory diagram for the operation of compressing still pictures by a coding method using conventional DCT.

FIG. 11 shows an example of applying the decoding system of FIG. 10 to a local decoder in a conventional moving-picture compression system shown in FIG. 12.

In the figure, a predictive error signal obtained by subtracting the motion compensation interframe predictive image at a differential circuit 1, is encoded at a DCT circuit 2, a quantizing circuit 3, and an encoding circuit 4. The quantization result is decoded at an inverse quantizing circuit 5 and an inverse DCT circuit 6, and is supplied to a distortion eliminator circuit 9. The characteristics of the distortion-eliminating process at that time is determined at a judging circuit 10 in the same manner as the decoding apparatus. The result of eliminating distortions is added to the motion compensation interframe predictive image at an adder circuit. A moving vector is obtained at a motion compensation predicting circuit 8 that incorporates an image memory having a variable delay function for motion compensation, and then a motion compensation interframe predictive image for the next frame is formed.

Although omitted in FIGS. 10 and 11, intraframe compression is inserted at intervals of a specified number of frames in an image-signal compression system using this apparatus. In that case, the signal from the motion compensation predicting circuit is not used. That is, the memory in the motion compensation predicting circuit has been reset.

Another embodiment of the present invention will be explained.

When a compression rate is increased in encoding in an apparatus to which the invention is applied, the quantization width becomes larger and the probability that a coefficient will be quantized into zero becomes high. Particularly, since high-frequency components generally have low power, so that most of them tend to be quantized into zero. Therefore, judging from whether the value of each coefficient is zero or not whether a transform coefficient is a significant coefficient or not, is more effective than comparing the absolute value of each coefficient with the threshold value. In this case, the output of the variable-length code decoding circuit 11 can be used as the input to the judging circuit 18 of FIG. 1.

Another embodiment is such that, when there are consecutive blocks that have only significant coefficients of very low-frequency components or no significant coefficients, they are grouped into macroblocks, which are then subjected to heavy low-pass filtering in a wide range.

For example, when in a portion where the tone changes very gradually, such as the sky or a white wall in the image, the tone has a stepwise change as a result of alternating-current components being lost due to high compression, eliminating distortions by filtering in blocks cannot remove distortions completely in broad perspective. When observing this as an image, people feel as if there were edges still left due to the human visual characteristics. Thus, by considering groups of several blocks or several tens of blocks whose alternating-current components are almost lost as macroblocks, and by smoothing a large area in each macroblock, smooth tone can be obtained.

This invention is not limited to the block size, the type of orthogonal transform, and the type of variable-length coding explained in the above embodiments. While in the embodiments, separate filters are used in the horizontal and vertical directions, respectively, a two-dimensional filter may be used in both directions. Further, the filters may be applied to only the vicinity of block boundaries, not to the entire block.

As described above, the present invention can provide an image-signal decoding apparatus that allows a simple circuit to eliminate distortions at a high speed without creating blurs in the image. This feature makes it possible to lower the manufacturing cost of a product to which the invention is applied and to achieve a more compact design. The invention may be applied to a digital electronic camera with a moving-picture reproduction function. In the case of a standard compression system, a modification only to the decoding apparatus will provide good results, while reproduction can be made in a conventional manner, and the degree of distortion elimination can be set as desired.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image signal decoding apparatus for decoding moving-picture data compressed per block by orthogonal transform, quantization and variable-length coding for each block, said apparatus comprising:

variable-length code decoding means for decoding the compressed moving-picture data, and for outputting the decoded moving-picture data, a moving vector per block, and information on block type;

distortion-eliminating means for eliminating a block distortion for moving-picture data decoded by said variable-length code decoding means, according to a distortion elimination characteristic of said distortion-eliminating means;

judging means for obtaining a signal band for each block from the decoded moving-picture data, and for changing the distortion elimination characteristic of said distortion-eliminating means for each block on the basis of at least one of the signal band, the moving vector for each block and the information on block type;

said judging means comprising:
threshold-comparing means for comparing the decoded moving-picture data from said variable-length code decoding means with a predetermined threshold value, and for outputting a comparison result of the comparison between the decoded moving-picture data and the threshold value;

maximum frequency-judging means for computing a maximum frequency in at least one of a horizontal and a vertical direction from the comparison result; and filter-determining means for determining at least one of kernel sizes and coefficients of at least one of horizontal and vertical filters on the basis of at least one of the maximum frequency in the horizontal and/or vertical directions, the moving vector and the information on block type.

2. An image signal decoding apparatus according to claim 1, wherein said judging means further comprises absolute value computing means for receiving the decoded moving-picture data from said variable-length code decoding means, and for computing an absolute value on the basis of the decoded moving-picture data.

3. An image signal decoding apparatus for decoding moving-picture data compressed per block by orthogonal transform, quantization and variable-length coding, said image signal decoding apparatus comprising:

variable-length code decoding means for decoding the compressed moving-picture data, and for outputting the decoded moving-picture data, a moving vector for each block, and information on block type;

inverse quantizating means for performing an inverse quantization for the moving-picture data decoded by said variable-length code decoding means;

inverse orthogonal transforming means for performing orthogonal transform for the moving-picture data to which the inverse quantization has been performed by said inverse quantizating means;

distortion-eliminating means for eliminating block distortions of the moving-picture data output from said inverse quantizating means, according to a distortion elimination characteristic of said distortion-eliminating means;

judging means for obtaining a signal band for each block of the moving-picture data to which the inverse quantization has been performed, and for changing the distortion elimination characteristic of said distortion-eliminating means for each block on the basis of at least one of the signal band, the moving vector for each block output from said variable-length code decoding means and the information on block type; and motion compensation predicting means for outputting a motion compensation predictive signal for a subsequent frame of the moving-picture data on the basis of at least one of the moving-picture data when block distortions have been eliminated by said distortion eliminating means, the motion vector for each block output from said variable-length code decoding means and the information on block type.

4. An image signal coding apparatus according to claim 3, wherein the orthogonal transform is a two-dimensional DCT, and the inverse orthogonal transform is a two-dimensional, inverse DCT.

5. An image signal decoding apparatus for decoding moving-picture data compressed per block by orthogonal transform, quantization and variable-length coding, said image signal decoding apparatus comprising:

variable-length code decoding means for decoding the compressed moving-picture data, and for outputting the decoded moving-picture data, a moving vector for each block, and information on block type;

distortion-eliminating means for eliminating block distortions of the moving-picture data decoded by said variable-length code decoding means, according to a distortion elimination characteristic of said distortion-eliminating means;

judging means for obtaining a signal band for each block from the decoded moving-picture data, and for changing the distortion elimination characteristic of said distortion-eliminating means on the basis of at least one of the signal band, the moving vector for each block and the information on block type;

said distortion-eliminating means comprising:

color-difference signal changing means for receiving luminance-signal pixel judgement information and a color difference signal of said decoded moving-picture data, for changing the color difference signal so as to eliminate mosquito noise thereof, and for outputting the changed color difference signal;

a source of a signal indicating a DCT coefficient of a specific frequency; and judging means for comparing the changed color difference signal with the signal indicating the DCT coefficient of a specific frequency, said judging means outputting the changed color difference signal when the signals satisfy predetermined conditions, whereas said judging means returning the changed color difference signal to said color-difference signal changing means when the signals deviate from the predetermined conditions.

\* \* \* \* \*